(12) United States Patent
Yun et al.

(10) Patent No.: US 11,205,818 B2
(45) Date of Patent: Dec. 21, 2021

(54) COVER ASSEMBLY AND BATTERY MODULE INCLUDING THE SAME

(71) Applicant: LG Chem, Ltd., Seoul (KR)

(72) Inventors: Youngsun Yun, Daejeon (KR); Hyun Wook Jeon, Daejeon (KR)

(73) Assignee: LG Chem, Ltd.

( * ) Notice: Subject to any disclaimer, the term of this patent is extended or adjusted under 35 U.S.C. 154(b) by 106 days.

(21) Appl. No.: 16/497,209

(22) PCT Filed: Nov. 1, 2018

(86) PCT No.: PCT/KR2018/013201
§ 371 (c)(1),
(2) Date: Sep. 24, 2019

(87) PCT Pub. No.: WO2019/088741
PCT Pub. Date: May 9, 2019

(65) Prior Publication Data
US 2020/0020903 A1    Jan. 16, 2020

(30) Foreign Application Priority Data
Nov. 3, 2017 (KR) .......................... 10-2017-0146285

(51) Int. Cl.
*H01M 50/00* (2021.01)
*H01M 50/20* (2021.01)
*H01M 50/581* (2021.01)

(52) U.S. Cl.
CPC ......... *H01M 50/20* (2021.01); *H01M 50/581* (2021.01); *H01M 2200/108* (2013.01)

(58) Field of Classification Search
CPC .......... H01M 50/20; H01M 2200/108; H01M 10/48; H01M 50/581; Y02E 60/10
See application file for complete search history.

(56) References Cited

U.S. PATENT DOCUMENTS 9,269,934 B2    2/2016  Yang et al.
2012/0328919 A1  12/2012  Laderer et al.
(Continued)

FOREIGN PATENT DOCUMENTS

CN    103137934 A    6/2013
CN    103975458 A    8/2014
(Continued)

OTHER PUBLICATIONS

International Search Report for PCT/KR2018/013201 dated Feb. 13, 2019.
(Continued)

*Primary Examiner* — Cynthia H Kelly
*Assistant Examiner* — Monique M Wills
(74) *Attorney, Agent, or Firm* — Lerner, David, Littenberg, Krumholz & Mentlik, LLP (57) ABSTRACT

A cover assembly includes a cover, a wire assembly, and a bottom cover. The cover includes a first groove formed to extend in a first direction and a second groove formed to extend in the first direction, parallel to the first groove. The wire assembly includes a first wire and a second wire positioned in the first groove and the second groove, respectively, and a third wire connected to a thermistor and positioned along one side of the cover. The bottom cover extends in a shape of the wire assembly, and is coupled to the cover to secure the wire assembly.

16 Claims, 9 Drawing Sheets

(56) References Cited

U.S. PATENT DOCUMENTS

| | | | |
|---|---|---|---|
| 2012/0329318 A1* | 12/2012 | Aoki | H01R 43/0207 439/521 |
| 2013/0266833 A1 | 10/2013 | Kim | |
| 2014/0322982 A1 | 10/2014 | Nakayama | |
| 2016/0126601 A1 | 5/2016 | Ichikawa et al. | |
| 2016/0133907 A1* | 5/2016 | Shitamichi | H01M 50/502 429/121 |
| 2017/0194771 A1 | 7/2017 | Aoki | |
| 2018/0212224 A1 | 7/2018 | Nakayama et al. | |
| 2018/0294463 A1* | 10/2018 | Mori | H01M 50/502 |

FOREIGN PATENT DOCUMENTS

| | | |
|---|---|---|
| CN | 104393227 A | 3/2015 |
| CN | 204516815 U | 7/2015 |
| CN | 105571740 A | 5/2016 |
| CN | 106784438 A | 5/2017 |
| EP | 1991880 A4 | 4/2010 |
| JP | 2001006643 A | 1/2001 |
| JP | 2006186045 A | 7/2006 |
| JP | 2011060675 A | 3/2011 |
| JP | 2016122575 A | 7/2016 |
| JP | 2017063052 A | 3/2017 |
| KR | 20120124763 A | 11/2012 |
| KR | 20130003574 A | 1/2013 |
| KR | 20130003575 A | 1/2013 |
| KR | 20140020375 A | 2/2014 |
| KR | 20160023377 A | 3/2016 |
| KR | 20170050511 A | 5/2017 |
| KR | 20170138888 A | 12/2017 |
| WO | 2015181930 A1 | 12/2015 |
| WO | 2017010295 A1 | 1/2017 |

OTHER PUBLICATIONS

Extended European Search Report including Written Opinion for Application No. EP18873953.6, dated Apr. 6, 2020, pp. 1-6.
Search Report from Chinese Application No. 201880018708.6 dated Sep. 2, 2021. 4 pgs.

* cited by examiner

COVER ASSEMBLY AND BATTERY MODULE INCLUDING THE SAME

CROSS-REFERENCE TO RELATED APPLICATION

This application is a national phase entry under 35 U.S.C. § 371 of International Application No. PCT/KR2018/013201, filed Nov. 1, 2018, which claims priority from Korean Patent Application No. 10-2017-0146285 filed on Nov. 3, 2017, the entire contents of which are incorporated herein by reference.

TECHNICAL FIELD

The present invention relates to a cover assembly and a battery module including the same.

BACKGROUND ART

In a battery module according to the conventional art, a rib is formed in a surrounding space as well as in an upper cover portion to which a wire harness (hereinafter, W/H) assembly portion is coupled. In such a case, an inefficient space is formed, and a space for accommodating a battery module is also reduced by as much as an empty space of an upper case. This is the reason for limiting a size of a battery cell accommodated in a battery module.

When the conventional rib is removed, there is a problem in that a wire of the W/H is significantly bent. Therefore, there is a need to change a shape of a thermistor due to removal of the rib.

DISCLOSURE

Technical Problem

An exemplary embodiment of the present invention provides a cover assembly with a new structure in which a wire harness (W/H) is assembled, and a battery module including the same.

Technical Solution

According to an aspect of the present invention, a cover assembly for accommodating a plurality of secondary battery cells includes a cover including a first groove formed to extend in a first direction and a second groove formed to extend in in the first direction, parallel to the first groove; a wire assembly including a first wire and a second wire positioned in the first groove and the second groove, respectively, and a third wire connected to a thermistor and positioned along one side of the cover; and a bottom cover extending in a shape of the wire assembly, and coupled to the cover to secure the wire assembly.

According to another aspect of the present invention, a battery module includes a cell assembly including a plurality of secondary batteries; a first cover assembly installed on the cell assembly to surround a first surface, one side, and an other side of the cell assembly; and a second cover coupled to the first cover assembly and installed on the cell assembly to surround a second surface facing the first surface, the one side, and the other side of the cell assembly. The first cover assembly may include a wire assembly including a first wire, a second wire, and a third wire, the first wire positioned in a first groove formed to extend in a first direction, the second wire positioned in a second groove formed to extend in the first direction, parallel to the first groove, and the third wire connected with a thermistor; and a bottom cover extending in a shape of the wire assembly for securing the wire assembly.

Advantageous Effects

An embodiment may provide a cover assembly with a new structure in which a W/H is assembled, and a battery module including the same.

MODE FOR INVENTION

In a battery module according to an embodiment, a position at which W/H is assembled may be changed to ensure a space for accommodating a battery cell, and thus, capacitance of battery cells accommodated in a battery module may be increased.

Hereinafter, as described with regard to an embodiment, to reduce a wire diameter of a wire harness (W/H), a wire assembly of the W/H may be divided into 2 pieces, and may be assembled in a space in a battery module cover that is not used according to the conventional art. Hereinafter, the wire assembly is a group of at least one wire, and wires constituting the wire assembly may not be connected with each other. Hereinafter, the wire assembly is simply referred to as a wire.

In an embodiment, a shape of a thermistor, and a fixing structure in which the thermistor is coupled to a battery module cover, may be changed, and thus, the thermistor may be fixed to a space that is narrowed by removing the rib.

For example, the wire of the W/H connected with the thermistor may be retracted in a side surface direction of the battery module cover. In this case, the problem of the reduced space of the upper cover causing the wire of the W/H connected with the thermistor to be significantly bent so as to damage internal soldering may be overcome.

In this case, a conventional hook structure for securing the wire of the W/H connected with the thermistor may be removed from the battery module upper cover, and according to an embodiment, the W/H may be secured using a bottom cover. When the bottom cover is used, the hook structure may be removed from the upper cover to simplify a shape of the upper cover and to reduce a height of the upper cover.

Hereinafter, embodiments will be described with reference to drawings.

Figure 1:
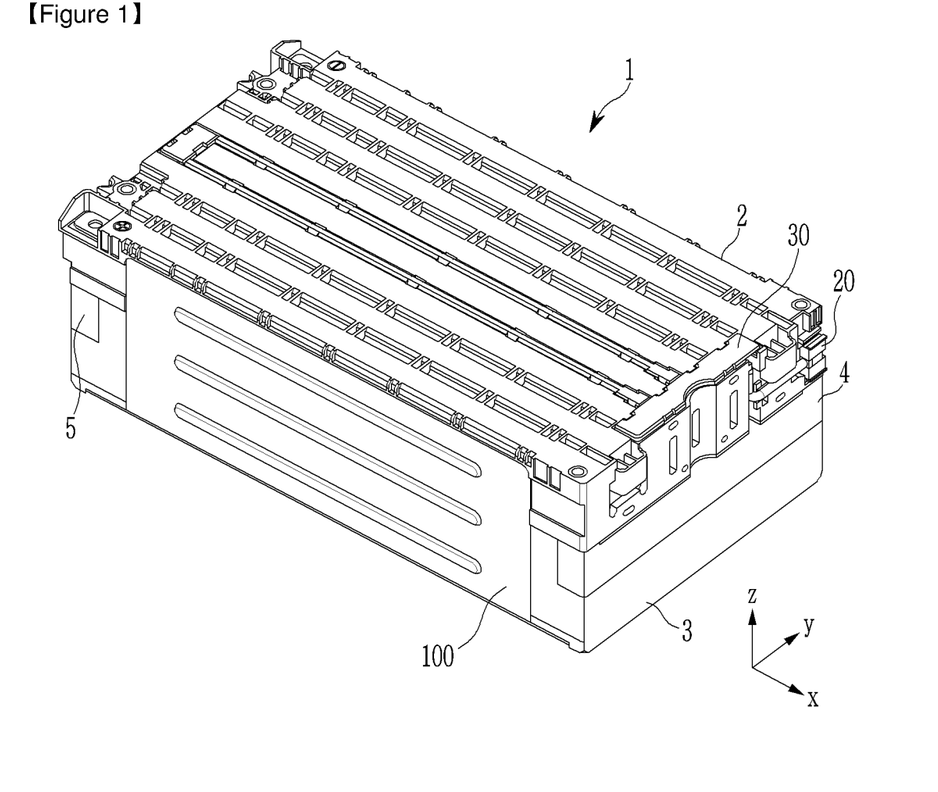
FIG. 1 is a schematic perspective view showing a configuration of a battery module.
Figure 2:
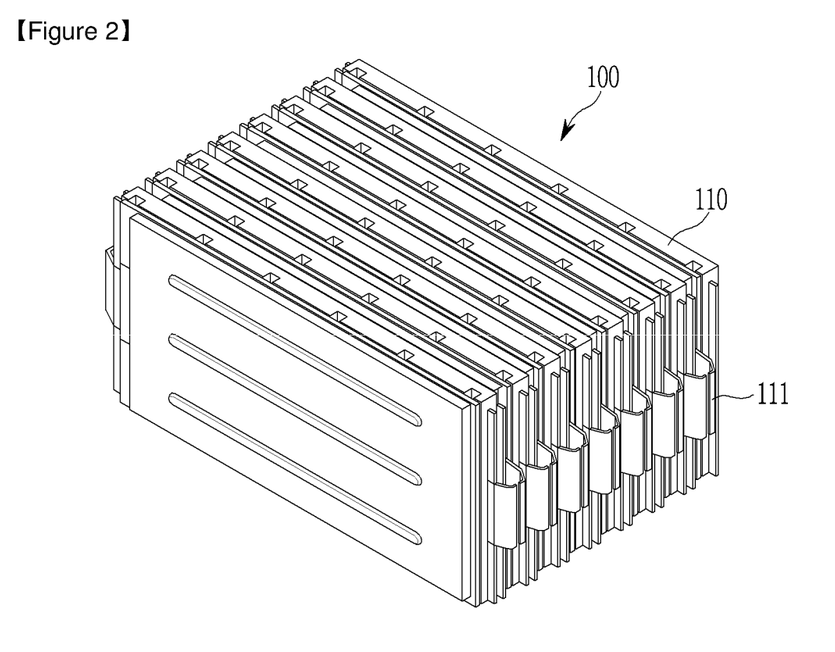
FIG. 2 is a perspective view showing a cell assembly accommodated in the battery module shown in FIG. 1.

FIG. 1 is a schematic perspective view showing a configuration of a battery module. FIG. 2 is a perspective view showing a cell assembly accommodated in the battery module shown in FIG. 1.

As shown in FIG. 1, a battery module 1 according to an embodiment may include an upper cover assembly 2, a lower cover 3, a first side surface cover 4, a second side surface cover 5, and a cell assembly 100.

As shown in FIG. 2, the cell assembly 100 may be a combination of a secondary battery including a plurality of secondary batteries 110. The cell assembly 100 may include a plurality of pouch-type secondary batteries, and a plurality of pouch-type secondary batteries may be disposed in one direction, e.g., in the y-axis direction as shown in FIG. 2.

Each of the pouch-type secondary batteries 110 may include an electrode lead 111, and the electrode lead 111 may include a positive lead and a negative lead. Here, each of the electrode leads 111 may be configured in a plate shape and may protrude out of a pouch case, as shown in FIG. 2. Particularly, the electrode lead 111 of each pouch-type secondary battery may protrude in the x-axis direction and then an end portion of the electrode lead 111 may be bent in a left or right direction (i.e., in the y-axis direction). The electrode lead 111 that is bent in a left direction (or a right direction) may contact the electrode lead 111 that is bent in a right direction (or a left direction) of another adjacent secondary battery. The two electrode leads 111 that contact each other may be fixed to each other via welding or the like, and thereby, secondary batteries in the cell assembly 100 may be electrically connected with each other.

The cell assembly 100 may include a cartridge (not shown) for arrangement of the plurality of pouch-type secondary batteries. The cartridge may be a component used to arrange secondary batteries, and may hold the secondary batteries to prevent movements of the secondary batteries and to guide arrangements of a plurality of secondary batteries. The cartridge may be configured in a rectangular ring shape with an empty central portion. In such a case, four edges of the cartridge may be positioned on an external circumference portion of a secondary battery.

The upper cover assembly 2 may be installed on the cell assembly 100 to surround an upper surface, one side, and the other side of the cell assembly 100. The lower cover 3 may be coupled to the upper cover assembly 2 and may be installed on the cell assembly 100 to surround a lower surface, one side, and the other side of the cell assembly 100.

A plurality of installation grooves for inserting an external circumferential surface of the cell assembly 100 thereinto may be formed on an internal surface of the upper cover assembly 2 and the lower cover 3. Portions corresponding to one side and the other side of the cell assembly 100 in each of the upper cover assembly 2 and the lower cover 3 may include a structure to be installed on a plurality of protruding electrodes and a plurality of electrode lead portions, which are positioned at one side and the other side of the cell assembly 100, and the corresponding structure may include a component that is electrically connected with the plurality of electrode leads to sense a cell voltage of each of a plurality of secondary batteries.

The first side surface cover 4 and the second side surface cover 5 may be installed at one side and the other side of a structure in which the upper cover assembly 2 and the lower cover 3 are coupled to the cell assembly 100, respectively.

The upper cover assembly 2 may include an upper cover 10, W/H 20, and a bottom cover 30. The W/H 20 may be assembled in a space formed by an upper surface and one side of the upper cover 10, and the bottom cover 30 for securing the W/H 20 to the upper cover assembly 2 may be coupled to the upper cover 10.

Figure 3:
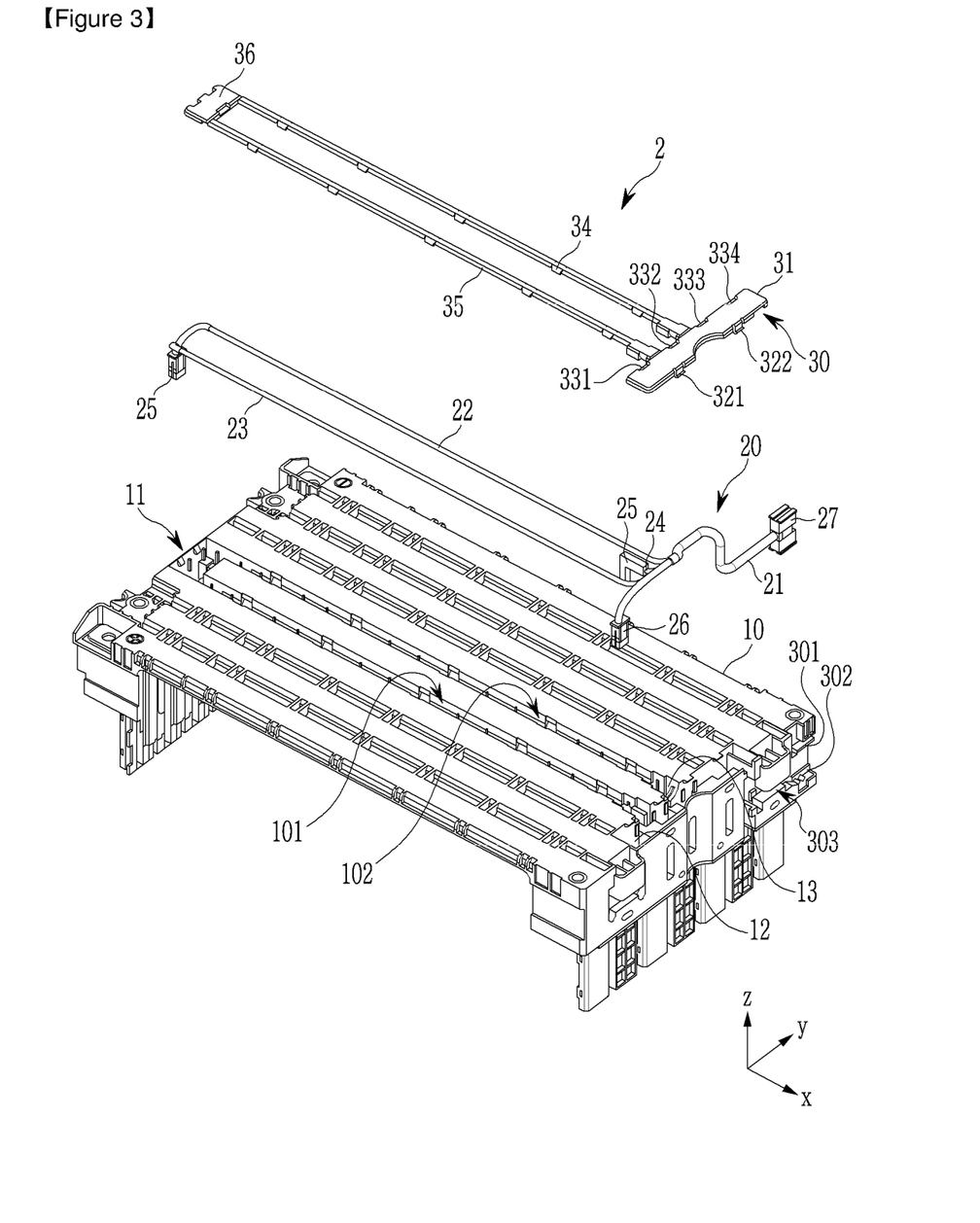
FIG. 3 is an exploded perspective view of an upper cover assembly according to an embodiment.
Figure 4:
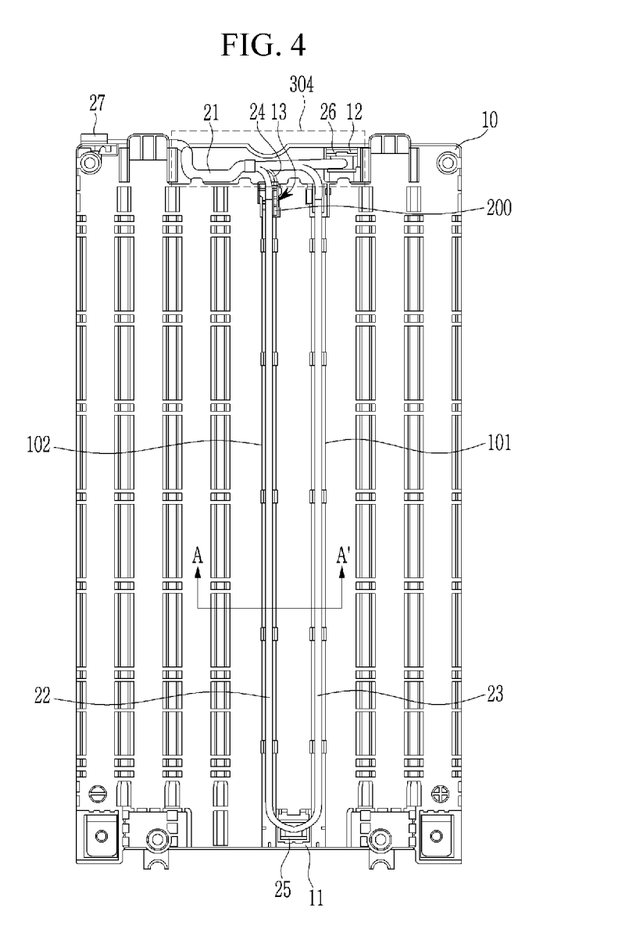
FIG. 4 is a top plan view of an upper cover with which a W/H is assembled, viewed from above to below along the z axis.
Figure 5:
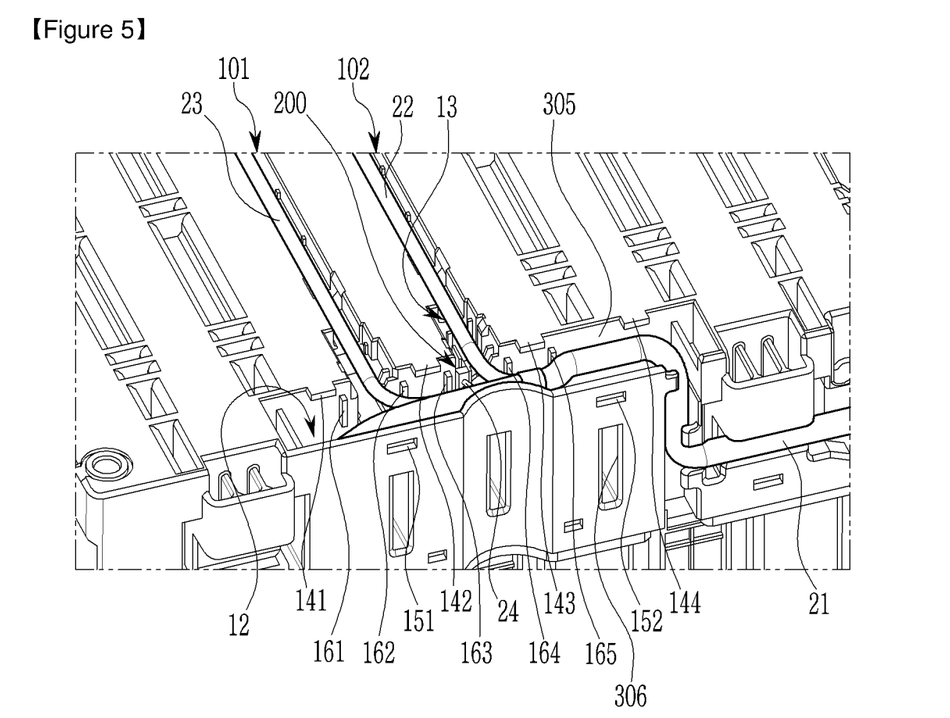
FIG. 5 is an enlarged view of a portion of an upper case with which a wire harness (W/H) is assembled.
Figure 6:
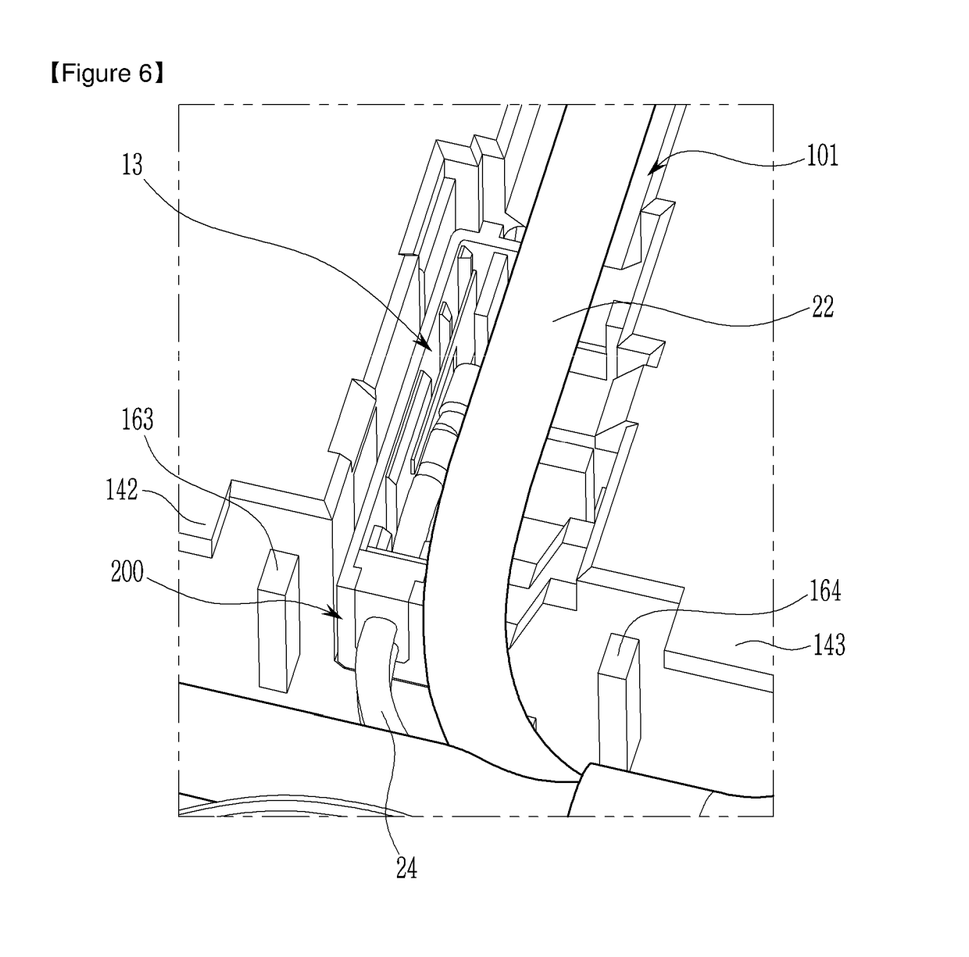
FIG. 6 is a re-enlarged view of a portion of an upper case with which a W/H is assembled.

FIG. 3 is an exploded perspective view of an upper cover assembly according to an embodiment. FIG. 4 is a top plan view of an upper cover with which the W/H is assembled, viewed from above along the z axis. FIG. 5 is an enlarged view of a portion of an upper case with which the W/H is assembled. FIG. 6 is a re-enlarged view of a portion of an upper case with which the W/H is assembled.

As shown in FIG. 3, the W/H 20 may include a plurality of wires 21 to 24 and a plurality of connectors 25 to 27, which are electrically connected with each other. The wire 21 may be a group of different wires 22 to 23. The connector 27 may be connected with a battery management system (not shown).

The connector 27 may be connected with one end of the wire 21, the connector 26 may be connected with the other end of the wire 21, and the connector 25 may be connected with an intermediate end to which the wires 22 and 23 branched from the wire 21 are coupled.

A rib may be removed from an upper surface of the upper cover 10, compared with the conventional art. According to an embodiment, two grooves 101 and 102 for assembling the W/H 20 may be formed to extend in parallel to the upper surface of the upper cover 10 in the x-axis direction. The two wires 22 and 23 may be branched from the wire 21, the wire 22 may be positioned in the groove 102, and the wire 23 may be positioned in the groove 101. The wire 24 may be branched from the wire 21 and may be electrically connected with the thermistor 200.

As shown in FIG. 3, the thermistor 200 may include a portion inserted into the groove 13, and a portion that extends in a direction in which the groove 102 is formed, for example, the x-axis direction.

A space for positioning the wire 21 may be formed at one side of the upper cover 10 and a predetermined region of an upper surface adjacent to the one side, and a structure such as a hook for affixing the connector 27 may be formed at one side of the upper cover 10.

For example, as shown in FIG. 3, the connector 27 may be fixed between two hooks 301 and 302 that are positioned adjacent an edge of one side of the upper cover 10. The wire 21 connected from the connector 27 may be positioned in a space 303 formed at one side of the upper cover 10, and a space 304 formed on the upper surface of the upper cover 10 shown in FIG. 4.

As shown in FIG. 4, on the upper surface of the upper cover 10, the connector 11 coupled to the connector 25 may be positioned at the center of a lower portion of the upper cover 10 based on the orientation of FIG. 4, and the connector 12 coupled to the connector 26 may be positioned at a right side at the center of an upper portion of the upper cover 10 in FIG. 4. As shown in FIG. 3, one end of the wire 21 may be connected with the connector 27, and the other end of the wire 21 may be connected with the connector 26.

As shown in FIG. 4, the thermistor 200 may be positioned in the groove 13 formed on the upper surface of the upper cover 10, and the wire 24 may be branched from the wire 21 in the x-axis direction and may be retracted toward the thermistor 200.

Referring to FIGS. 5 and 6, the groove 13 may be positioned to be connected with the groove 102 and may be formed to be deeper than the groove 102 in the z-axis direction. The thermistor 200 may be inserted into the groove 13, and the wire 22 may be positioned on the space into which the thermistor 200 is inserted. As such, when the wire 22 is positioned in the groove 102, a position of the groove 13 may be determined to insert the thermistor 200 into a space below the wire 22, and a shape of the groove 13 may be determined in consideration of a shape of the thermistor 200.

As shown in FIG. 5, the W/H 20 may be assembled on the upper cover 10, and then, the bottom cover 30 may be coupled to the upper cover 10.

As shown in FIG. 3, the bottom cover 30 may include a first sub bottom cover 34 for covering the wire 22, a second sub bottom cover 35 for covering the wire 23, a third sub bottom cover 36 for covering the connector 25, and a main bottom cover 31 for covering the wire 21. The first sub bottom cover 34 and the second sub bottom cover 35 may extend in parallel to each other in the x-axis direction between the main bottom cover 31 and the third sub bottom cover 36, and the main bottom cover 31 may extend in the y-axis direction. One end of the first sub bottom cover 34 may be coupled to the main bottom cover 31, the other end of the first sub bottom cover 34 may be coupled to the third sub bottom cover 36, one end of the second sub bottom cover 35 may be coupled to the main bottom cover 31, and the other end of the second sub bottom cover 35 may be coupled to the third sub bottom cover 36.

As shown in FIG. 5, a plurality of protrusions 141 to 144 may be positioned on an upper surface of the upper cover 10, adjacent to the space 304, and supports 161 to 165 may be positioned on an internal surface 304 of the upper cover 10.

Each of the supports 161 to 165 are spaced apart along the y-axis direction, and each is in the form of a protrusion that is elongated along the z-axis direction. The supports 161 to 165 may support the main bottom cover 31, and the main bottom cover 31 may be coupled to the plurality of protrusions 141 to 144. Accordingly, the supports 161 to 165 may be spaced apart from the upper surface of the upper cover 10 by a distance corresponding to the thickness of the main bottom cover 31. Although FIG. 5 illustrates the case in which the supports 161 to 165 are shaped like a short bar, the present invention is not limited thereto. The supports 161 to 165 may have any form for supporting the main bottom cover 31, as long as the supports 161 to 165 provide a space for positioning the wire 21 in the space 304. The two grooves 151 and 152 for coupling with the main bottom cover 31 may be formed on an internal surface 306 facing the internal space 304.

As shown in FIG. 3, a plurality of depressions 331 to 334 may be formed on the main bottom cover 31 for receiving the plurality of protrusions 141 to 144 formed on the upper cover 10, and two hooks 321 and 322 may be formed on the main bottom cover 31 for insertion into the two grooves 151 and 152 formed at one side of the upper cover 10.

According to an embodiment, the number of grooves, hooks, protrusions and depressions, and so on, which are formed on the upper cover 10, the bottom cover 30, or the like, are merely an example, and the present invention is not limited thereto. Grooves, hooks, protrusions and depressions, and so on may be formed in an appropriate number to couple the upper cover 10 and the bottom cover 30 to each other.

Figure 7:
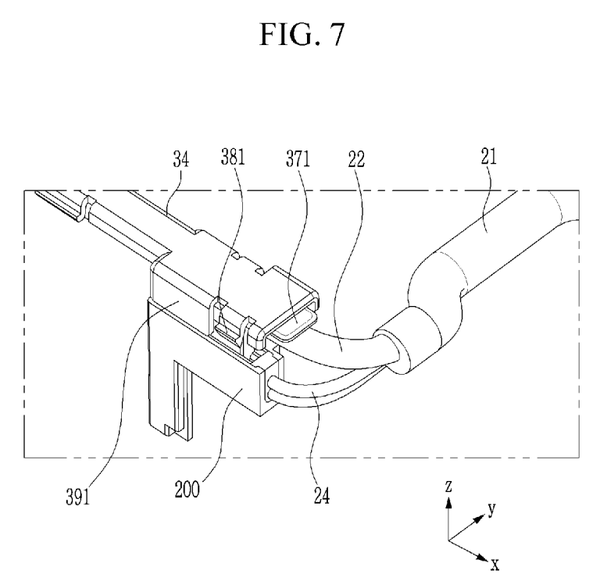
FIG. 7 is a diagram showing an assembly of a bottom cover, a thermistor, and a W/H.

FIG. 7 is a diagram showing assembly of a bottom cover, a thermistor, and the W/H.

For convenience, FIG. 7 illustrates only wires 21, 22, and 24 of the W/H 20.

An extension 371 positioned below the main bottom cover 31 while being coupled to the main bottom cover 31 may be positioned at one end of the first sub bottom cover 34. The extension 371 may be spaced below an upper surface of the first sub bottom cover 34 by the thickness of the main bottom cover 31. The extension 371 may support the main bottom cover 31.

A hook 381 for coupling the first sub bottom cover 34 to the upper cover 10 may be positioned at a side portion adjacent to one end of the first sub bottom cover 34. An extension 391 for insertion into the groove 13 for maintaining positioning with respect to the upper cover 10 may be located next to the hook 381 in the first sub bottom cover 34, the extension 391 being bent in a perpendicular direction to the upper surface of the first sub bottom cover 34. In this case, the extension 391 may have elasticity for pushing toward a surface of the upper cover 10, to which the extension 391 is held close.

In the upper cover 10, a shape of a groove positioned to be connected with the second groove 101 may be the same as the groove 13. Accordingly, the second sub bottom cover 35 may include the same components as the first sub bottom cover 34, including the extension 371, the hook 381, and the extension 391.

In FIG. 7, the first sub bottom cover 34 may secure the wire 22 and the thermistor 200 while covering the thermistor 200 and the wire 22. The wire 24 may be branched from the wire 21 in the form of a smooth curved line and may be retracted toward the thermistor 200 in the x-axis direction.

Figure 8:
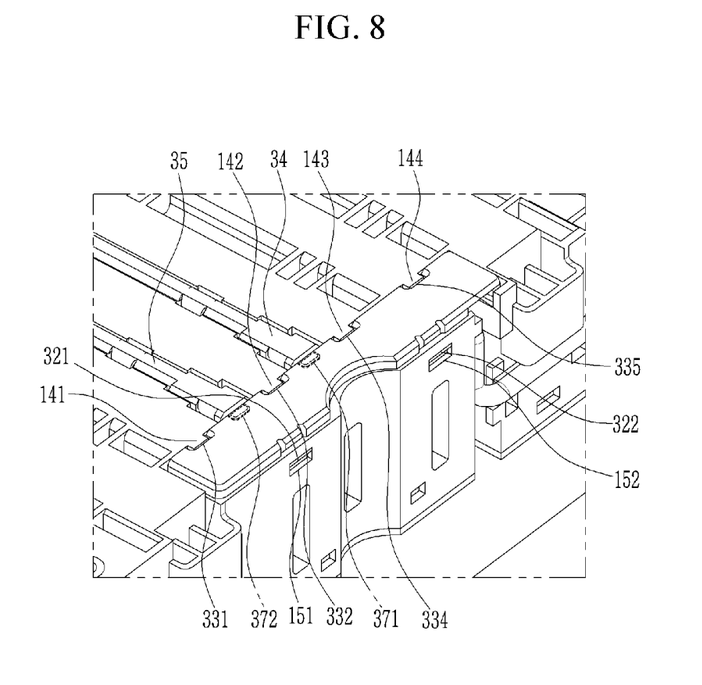
FIG. 8 is a diagram showing an assembly of a bottom cover, a W/H, and an upper cover.

FIG. 8 is a diagram showing assembly of a bottom cover, a W/H, and an upper cover.

In FIG. 8, an extension 372 is a component positioned at one end of the second sub bottom cover 35, and an arrangement in which the extensions 371 and 372 are positioned below the main bottom cover 31 is indicated by dotted lines.

As shown in FIG. 8, the hooks 321 and 322 of the main bottom cover 31 may be coupled to the grooves 151 and 152, and the protrusions 141 to 144 of the upper cover 10 may be engaged and coupled to the corresponding depressions 331 to 334 of the main bottom cover 31, respectively.

Figure 9:
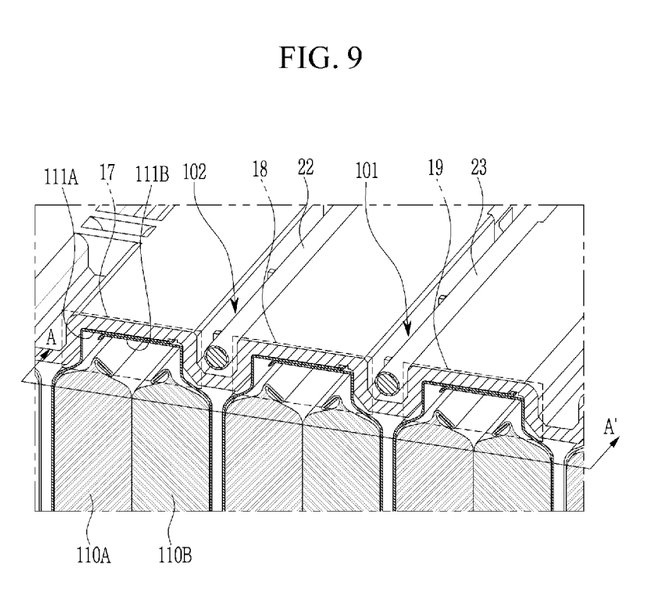
FIG. 9 is a perspective view showing a portion of a section taken along A-A' of FIG. 4.

FIG. 9 is a perspective view showing a portion of a section taken along A-A' of FIG. 4.

In the upper cover 10, a convex portion 17 for providing a space with which the electrode leads 111A and 111B of two adjacent secondary batteries 110A and 110B are bent and connected may be formed. As shown in FIG. 9, the groove 102 may be formed between the convex portion 17 and a convex portion 18 adjacent to the convex portion 17, and the wire 22 may be assembled in the groove 102. Similarly, the groove 102 may be formed between the convex portion 18 and a convex portion 19 adjacent to the convex portion 18, and the wire 22 may be assembled in the groove 102.

As such, a rib that is present according to the conventional art may be removed from an upper cover assembly according to an embodiment, and thus, a space for accommodating a battery cell may be additionally ensured, and capacitance of battery cells accommodated in a battery module may be increased. According to an embodiment, a thermistor with an appropriate shape and a structure for affixing the thermistor may be provided in a space that is narrowed by removing the rib.

Although the above description has been given to distinguish 'upper' and 'lower' from each other, this is based on the drawings and the present invention is not limited thereto.

The invention claimed is:

1. A cover assembly for accommodating a plurality of secondary battery cells, comprising:
    a cover including a first groove formed to extend in a first direction and a second groove formed to extend in the first direction, parallel to the first groove;

a wire assembly including a first wire and a second wire positioned in the first groove and the second groove, respectively, and a third wire connected to a thermistor and positioned along one side of the cover; and a bottom cover extending in a shape of the wire assembly, and coupled to the cover to secure the wire assembly, wherein the bottom cover includes:

a main bottom cover for covering a portion of the wire assembly positioned on an upper surface of the cover, and first and second sub bottom covers for covering the first wire and the second wire, respectively.

2. The cover assembly of claim 1, wherein:
the third wire is branched from the wire assembly and is retraced toward the thermistor in a direction facing the one side.

3. The cover assembly of claim 1, wherein:
the thermistor is inserted into a third groove that is connected with the first groove and is deeper than the first groove.

4. The cover assembly of claim 1 wherein:
the main bottom cover includes at least two depressions formed at one side of the main bottom cover, and at least two hooks formed at the other side of the main bottom cover.

5. The cover assembly of claim 4, wherein:
the cover includes at least two protrusions formed at positions corresponding to positions of the at least two depressions of the main bottom cover, and at least two grooves formed at positions corresponding to the at least two hooks of the main bottom cover.

6. The cover assembly of claim 1 wherein:
the first sub bottom cover includes an extension that extends along the first groove and is positioned below the main bottom cover at one end of the first sub bottom cover; and
the second sub bottom cover includes an extension that extends along the second groove and is positioned below the main bottom cover at one end of the second sub bottom cover.

7. The cover assembly of claim 6, wherein:
the first sub bottom cover further includes a hook for coupling the first sub bottom cover to the cover, and an extension for maintaining positioning with respect to the case, the extension being bent in a vertical direction for insertion into a third groove in the cover, the third groove being formed in the cover so as to be connected to the first groove.

8. The cover assembly of claim 7, wherein:
the thermistor is inserted into the third groove.

9. The cover assembly of claim 1, wherein:
the wire assembly includes a first connector connected with one end of the wire assembly, a second connector connected with the other end of the wire assembly, and a third connector connected with an intermediate end to which the first and second wires branched from the wire assembly are coupled.

10. The cover assembly of claim 9, wherein:
a fourth connector and a fifth connector, which are connected to the second connector and the third connector, respectively, are positioned on the cover.

11. A battery module comprising:
a cell assembly including a plurality of secondary batteries;
a first cover assembly installed on the cell assembly to surround a first surface, one side, and an other side of the cell assembly; and
a second cover coupled to the first cover assembly and installed on the cell assembly to surround a second surface facing the first surface, the one side, and the other side of the cell assembly,
wherein the first cover assembly includes:
a wire assembly including a first wire, a second wire, and a third wire, the first wire positioned in a first groove formed to extend in a first direction, the second wire positioned in a second groove formed to extend in the first direction, parallel to the first groove, and the third wire connected with a thermistor, and
a bottom cover extending in a shape of the wire assembly for securing the wire assembly, the bottom cover including:
a main bottom cover for covering a portion of the wire assembly positioned on an upper surface of the first cover assembly, and
first and second sub bottom covers for covering the first wire and the second wire, respectively.

12. The battery module of claim 11, wherein:
the thermistor is inserted into a third groove that is connected with the first groove and is deeper than the first groove.

13. The battery module of claim 12, wherein:
the third wire is branched from the wire assembly and is retraced toward the thermistor in a direction facing the one side of the first cover assembly.

14. The battery module of claim 11, wherein:
the first sub bottom cover extends along the first groove, and the second sub bottom cover extends along the second groove.

15. The battery module of claim 14, wherein:
the first sub bottom cover includes a hook for coupling the first sub bottom cover to the first cover assembly, and an extension for maintaining positioning with respect to the first cover assembly, the extension being bent in a vertical direction for insertion into a third groove in the cover, the third groove being formed in the cover so as to be connected to the first groove.

16. The battery module of claim 14, wherein:
the first sub bottom cover includes an extension that is positioned below the main bottom cover at one end of the first sub bottom cover; and
the second sub bottom cover includes an extension that is positioned below the main bottom cover at one end of the second sub bottom cover.

* * * * *